United States Patent Office 3,445,752
Patented May 20, 1969

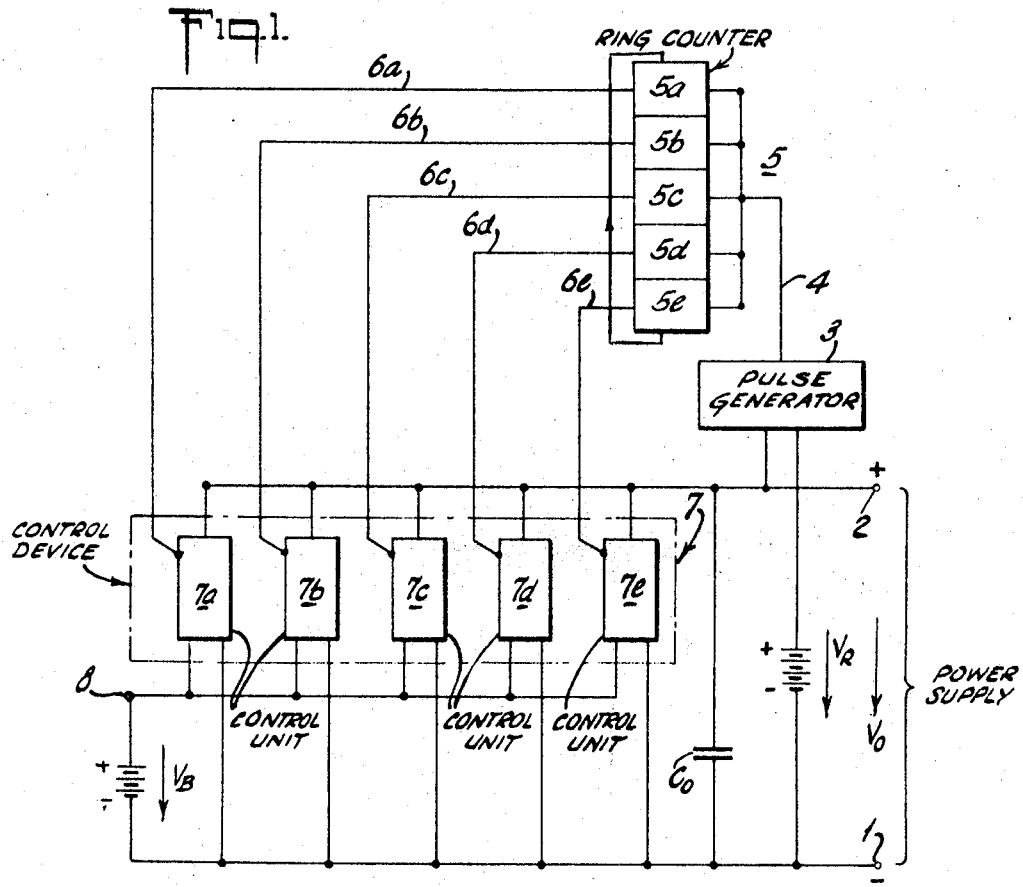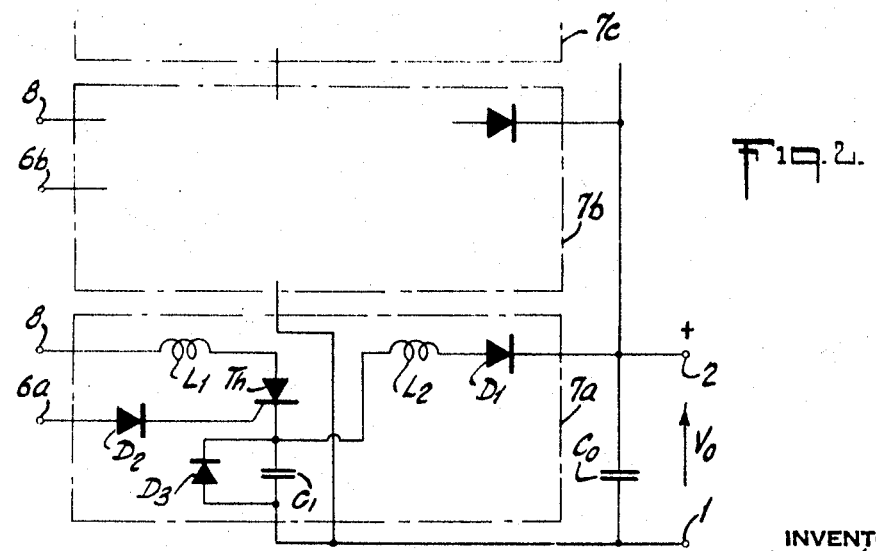

3,445,752
DIRECT CURRENT REGULATED POWER SUPPLY
Ivan Horvat, Wettingen, Switzerland, assignor to Patelhold Patentvertungs- and Elektro-Holding A.G. Glarus, Switzerland
Filed July 15, 1966, Ser. No. 565,555
Claims priority, application Switzerland, July 19, 1965, 10,087/65
Int. Cl. G05f *1/40, 1/52, 1/60*
U.S. Cl. 323—22    4 Claims

ABSTRACT OF THE DISCLOSURE

In a switching mode voltage regulator, a plurality of controlled rectifier switching devices consecutively and periodically apply predetermined charges from an auxiliary voltage source to a regulating capacitor shunting the main voltage source to be regulated. The switching devices are controlled each by one of the outputs of the stages of a ring counter having a counting frequency varying in proportion to the difference between the main source voltage and a reference voltage.

---

The present invention relates to direct current (DC) regulated power supplies or voltage regulators, more particularly to regulators of this type operating in the so-called switching mode and utilizing controlled rectifiers or the like electronic control devices, to result in a highly efficient and basically lossless voltage regulation.

The invention is more specifically concerned with DC voltage regulators of this type comprising a first auxiliary standard or reference voltage source and a second auxiliary non-regulated source, such as a battery, and switching means to apply a series of discrete energy increments or charging pulses from said second source to a storage or regulating capacitor shunting the power source to be regulated, the rate of said pulses varying, in dependence upon the voltage differential between the source being regulated and said reference voltage, in such a manner as to maintain the voltage of the power source at the value substantially equal to said reference voltage.

In applying the discrete or incremental energies to the regulating capacitor in a device of the foregoing type at relatively high operating or recurrence frequencies, only electronic control devices have been found suitable to perform the relatively rapid switching operations required, such as junction transistors in the case of relatively low voltages and powers to be regulated, or controlled rectifiers, such as SCR's (silicon controlled rectifiers), thyristors, or the like, for the regulation of relatively larger powers and voltages.

However, even with the use of controlled rectifiers, such as thyristors, SCR's or the like electronic switching devices, the upper limit of the switching frequency is found to be relatively low, being of the order of 25 kilocycles, this relatively low value of the switching frequency being due mainly to the rather long recovery time, or time period required by the rectifier to assume its normal capacity to block the current in the forward or conducting direction of the devices. On the other hand, operation above the safe limit frequency, or at frequencies resulting in an insufficient recovery time is practically possible only, aside from other defects and drawbacks, by the use of expensive and bulky noise filters.

Accordingly, an important object of the present invention is the provision of novel and improved means in conjunction with DC voltage regulators of the referred to type, whereby the switching frequency or rate of application of the energy increments to the voltage being regulated and, in turn, the regulating efficiency and stability of the regulator devices may be increased, substantially without reducing the recovery time of the electronic switching devices (thyristors, SCR's, etc.).

Another object of the invention is the provision of means in conjunction with a voltage regulator or stabilizing device of the referred to type, to enable the device to regulate or compensate relatively rapid voltage deviations from the desired or operating value by a practically limitless increase of the rate or recurrence frequency of the applied energy increments, substantially independently of the recovery time of the electronic control devices, such as SCR's, thyristors, etc., used.

The invention, both as to the foregoing and ancillary objects, as well as novel aspects thereof, will be better understood from the following detailed description, taken in reference to the accompanying drawing forming part of the specification and in which:

FIG. 1 is a block diagram of a DC voltage regulating system embodying the principles of the invention; and FIG. 2 is a more detailed partial circuit diagram of one of the control units forming part of FIG. 1.

Like reference characters denote like parts in both views of the drawing.

With the foregoing objects in view, the invention, according to one aspect thereof, involves generally the provision, in conjunction with a DC power source to be regulated, of a pulse generator being controlled by the difference voltage between the voltage of said source and a standard or reference voltage, said generator adapted to produce a series of electrical control pulses of substantially constant width and having a repetition or recurrence frequency which is a unique function of said differential voltage. The output pulses of said generator serve to control a multiple periodic switch in the form of an electronic ring counter having a predetermined number ($n$) of stages or outputs, to produce a corresponding number of interleaved output pulse series of recurrence frequency $1/n$ and serving, in turn, for the control of a corresponding number of electronic switching devices, in the form of thyristors, SCR's or the like devices. The switching devices, in turn, serve to sequentially and periodically apply, at a rate or sequence determined by the frequency of said control pulses, discrete incremental charges or energies from an auxiliary non-regulated current source, such as a battery, upon a storage capacitor shunting the power source to be regulated. In other words, the sequential output pulses of the ring counter act to successively fire the gates of the controlled rectifiers the outputs of which intermittently apply the auxiliary voltage to the storage or regulating capacitor shunting the source being regulated. As a consequence, the switching frequency is increased by a factor equal to the number ($n$) of counting stages and electronic switching devices used, or the switching interval and, in turn, the recovery time of any switching device is increased correspondingly, to enable the devices to recover sufficiently between one and the next following switching cycle or operation.

More particularly, in a DC voltage regulator of this type, the pulse repetition frequency will be low for slight voltage deviations between the source being regulated and the reference voltage, resulting in a relatively small number of charge or energy increments per unit time being applied to the regulating capacitor, to restore the source voltage to its desired value upon reaching zero deviation of said voltages or zero frequency of the pulses. In case of larger voltage deviations, the repetition frequency of the control pulses increases accordingly, to result in an increased sequence of the applied incremental energies such as to again restore the source voltage to the value determined by the reference voltage. The same operation occurs in the opposite direction as the source voltage decreases, in a manner as will become further apparent as the description proceeds.

This function of the invention can be secured for relatively rapid voltage changes simply by an increase of the switching frequency by utilizing an appropriate number of counter stages and associated control devices, substantially independently of the recovery time of the devices, as will be understood from the foregoing.

In order to effect the intermittent operation in applying the discrete energy increments from the auxiliary source to the regulating capacitor, the electronic switching devices are advantageously operated in a transient mode by first charging an auxiliary capacitor which is immediately discharged upon the main or regulating capacitor, in a manner as will become further apparent as the description proceeds in reference to the drawing.

Referring more particularly to the drawing, FIG. 1, there is shown, by way of example, a switching type DC voltage regulator system according to the invention embodying a five-stage ring counter acting as a periodic multiple switch and cooperating with a corresponding number of control units. $V_o$ denotes the voltage of the source to be regulated (rectifier power supply, rotary DC generator, etc.) having a pair of output terminals 1 and 2, said voltage being continuously compared with a reference or standard voltage $V_R$ (dry cell, storage battery, etc.), to produce a difference voltage representative of the deviation of $V_o$ from the desired or reference value $V_R$ and being applied to a pulse generator 3 adapted to produce a consecutive series of control pulses having a recurrence frequency being a unique, such as a linear, function of said differential voltage. Pulse generators of this type are well known in the art, such for instance in the form of a free-running multivibrator having its grids or equivalent control electrodes returned through a positive potential provided by said differential voltage.

The output pulses of the generator 3, having a repetition frequency varying in proportion to the deviation of $V_o$ from $V_R$, are applied, via a lead 4 to the common input of the stages $5a$–$5e$ of a conventional ring pulse counter 5, whereby said pulses will appear in succession and periodic sequence at the outputs of said counter stages, in a manner well known to those skilled in the art. In other words, the ring counter 5 acts like a multiple rotary switch or distributor having a plurality of contacts, to sequentially and periodically apply control pulses by way of its output leads $6a$–$6e$ to the control electrodes of the switching or control units $7a$–$7e$, respectively, said switch rotating at an equivalent speed which varies in proportion to the differential voltage $V_o - V_R$.

Applied to the inputs 1, 8 of the units $7a$–$7e$ is an auxiliary non-regulated voltage $V_B$, supplied by a battery or the like, while the outputs of the units $7a$–$7e$ are connected in parallel to the storage or regulating capacitor $C_o$ shunted across the source 1, 2 to be regulated.

In operation, as the voltage $V_o$ decreases below the desired or reference voltage $V_R$, as a result of load changes of the source 1, 2 or due to other causes, the ever increasing differential voltage $V_o - V_R$ applied to the pulse generator 3 results, in a continuous sequential application, by way of the counter 5, of control or firing pulses or potentials to the control units $7a$–$7e$ which may comprise a number of SCR's or the like electronic control devices. This, in turn, causes a corresponding number of sequential charge increments to be applied from the scource $V_B$ to the capacitor $C_o$ until restoring the voltagle $V_o$ to its desired value equal to the reference voltage $V_R$, and vice versa. As a consequence, by using a sufficiently high switching frequency, determined by the pulse recurrence frequency of the generator 3, and an appropriate number of counter stages and electronic control devices, it is possible, in the manner described, to compensate or regulate relatively rapid variations of $V_o$, without affecting the recovery time of the devices whose idle or switching intervals have been increased in proportion to the number of counter stages and swtiching devices used.

FIG. 2 shows, by way of example, a preferred circuit for the control units $7a$–$7e$ according to the invention, utilizing a thyristor Th, SCR, or an equivalent controlled rectifier or the like solid state electronic switching device. Upon the firing of the thyristor Th by the respective output pulse of the ring counter 5, i.e. via the lead $6a$ and decoupling diode $D_2$, there is established an electric charging circuit across the terminals 8, 1 of the source $V_B$ by way of a first inductor $L_1$, the anode-cathode or output path of the thyristor Th and an auxiliary capacitor $C_1$. As a result of the transient or charging current through the series-resonant circuit $L_1$–$C_1$, the capacitor $C_1$ will be charged to a voltage about twice the auxiliary or battery voltage $V_B$ due to the overshooting effect of the charging current by the action of the inductance of $L_1$.

As soon as the charging voltage of capacitor $C_1$ exceeds the source voltage $V_o$ between the terminals 1, 2, the decoupling diode $D_1$ starts to conduct, whereby to transfer the charge or energy of the capacitor $C_1$ upon the regulating capacitor $C_o$ and, in turn, upon the source 1, 2, until $C_1$ has been fully discharged. In other words, a series of discrete power or energy pulses or increments are transferred from the auxiliary source $V_B$ to the source being regulated subsequently to the successive excitations of the gates of the devices Th of the units $7a$–$7e$, to result in the restoration of $V_o$ to its desired value equal to the reference voltage $V_R$. Since the rate of the applied energy pulses is a function of the voltage differential $V_o - V_R$, the average energy per unit time applied to the capacitor $C_o$ varies accordingly, whereby to result in a stabilization or voltage regulation for both increasing and decreasing differential voltages.

In order to prevent the energy stored in the inductor L of the discharge circuit $C_1$–$L_2$–$C_o$ from reversely charging the capacitor $C_1$, after the full discharge of the capacitor, there is provided a further decoupling diode $D_3$ in the discharge circuit shunting the capacitor $C_1$ and causing the stored inductive energy of $L_2$ to be applied to the output circuit ($C_o$) after complete discharge of the capacitor $C_1$.

An advantage of the circuit of FIG. 2 is the fact that, due to the arrangement of the thyristor Th between the inductor $L_1$ and auxiliary capacitor $C_1$, a special coupling device (transformer, etc.) between the counter output ($6a$) and the gate or firing electrode of the thyristor Th is dispensed with. At the same time, the transient operation of the thyristor or equivalent controlled rectifier, or charging and discharging of the capacitor $C_1$, makes it unnecessary to provide any special means for the extinguishment of the main discharge of the thyristor Th, to restore the same to a condition for initiating a subsequent firing and switching operation. On the other hand, if by electronic switching devices operating on an on-off basis by the application and removal, respectively, of a control or firing potential are used, the energy of the source $V_B$ having a suitable voltage may be used to directly charge the capacitor $C_o$, to apply thereto the required energy pulses or increments in accordance with the novel concept of the invention.

As will be understood, similar control circuits as shown for $7a$ in FIG. 2 are provided for the remaining control devices $7b$–$7e$ connected in parallel to the capacitor $C_o$.

In the foregoing the invention has been described in reference to a specific illustrative device. It will be evident, however, that variations and modifications, as well as the substitution of equivalent parts or devices for those shown herein for illustration, may be made without departing from the broader spirit and purview of the invention as set forth in the appended claims. The specification and drawing is accordingly to be regarded in an illustrative rather than in a restrictive sense.

I claim:

1. In combination with a DC power source, a voltage regulator comprising in combination:

(1) means providing a reference voltage, (2) a pulse generator adapted to produce a series of electrical control pulses of substantially constant width and recurrence frequency varying in proportion to a control voltage applied thereto, (3) means to apply a voltage equal to the difference between the voltage of said source and said reference voltage to said generator, to vary the pulse recurrence frequency in proportion to the deviation of the source voltage from said reference voltage, (4) an electronic ring pulse counter having a predetermined number of output counting stages and a common input, (5) means to apply said control pulses to said input, (6) a plurality of electronic switching units equal in number to the number of output stages of said counter and having control electrodes each operably connected to one of said counter output stages, (7) a regulating storage capacitor shunting said source, (8) an auxiliary non-regulated voltage source, and (9) circuit means operably connecting said auxiliary source, said switching units and said capacitor, to apply a continuous series of discrete energy increments from said auxiliary source to said capacitor at a rate proportional to said differential voltage, to thereby maintain the voltage of said power source at a value substantially equal to said reference voltage.

2. In a voltage regulator as claimed in claim 1, wherein each of said switching units includes a controlled junction rectifier having a gate electrode connected to one of said counter output stages, and means connecting each of said rectifiers to said capacitor and said auxiliary source, to apply a sequence of discrete energy increments to said capacitor at the rate of said control pulses.

3. In a voltage regulator as claimed in claim 1, wherein each of said switching units includes a controlled junction rectifier having a gate electrode, an auxiliary capacitor, an inductor, means connecting said rectifier, said auxiliary capacitor and said inductor in series, to form a charging circuit, and a discharge circuit including a decoupling diode, said auxiliary capacitor and said regulating capacitor.

4. In a voltage regulator as claimed in claim 3, said discharge circuit including a further inductor, and a further decoupling diode shunting said auxiliary capacitor with its current passing direction opposite to the current passing direction of said rectifier.

References Cited

UNITED STATES PATENTS

| | | | |
|---|---|---|---|
| 3,300,656 | 1/1967 | Meier et al. | |
| 3,305,794 | 2/1967 | Seelig | 321—45 X |
| 3,328,725 | 6/1967 | Seelig | 331—117 X |

JOHN F. COUCH, *Primary Examiner.*

A. D. PELLINEN, *Assistant Examiner.*

U.S. Cl. X.R.

307—223; 320—1; 323—38